US012586569B2

(12) United States Patent
Yang et al.

(10) Patent No.: US 12,586,569 B2
(45) Date of Patent: Mar. 24, 2026

(54) KNOWLEDGE DISTILLATION WITH DOMAIN MISMATCH FOR SPEECH RECOGNITION

(71) Applicant: Google LLC, Mountain View, CA (US)

(72) Inventors: Tien-Ju Yang, Mountain View, CA (US); You-Chi Cheng, Mountain View, CA (US); Shankar Kumar, New York, NY (US); Jared Lichtarge, Mountain View, CA (US); Ehsan Amid, Mountain View, CA (US); Yuxin Ding, Mountain View, CA (US); Rajiv Mathews, Sunnyvale, CA (US); Mingqing Chen, Saratoga, CA (US)

(73) Assignee: Google LLC, Mountain View, CA (US)

( * ) Notice: Subject to any disclaimer, the term of this patent is extended or adjusted under 35 U.S.C. 154(b) by 240 days.

(21) Appl. No.: 18/488,578

(22) Filed: Oct. 17, 2023

(65) Prior Publication Data

US 2024/0135918 A1    Apr. 25, 2024
US 2024/0233707 A9    Jul. 11, 2024

Related U.S. Application Data

(60) Provisional application No. 63/380,140, filed on Oct. 19, 2022.

(51) Int. Cl.
    *G10L 15/06*      (2013.01)
    *G10L 15/197*     (2013.01)
    *G10L 15/30*      (2013.01)
(52) U.S. Cl.
    CPC .......... *G10L 15/063* (2013.01); *G10L 15/197* (2013.01); *G10L 15/30* (2013.01);
             (Continued)

(58) Field of Classification Search
    CPC ................... G10L 15/063; G10L 15/30; G10L 2015/0635; G10L 2015/0636
             (Continued)

(56) References Cited

U.S. PATENT DOCUMENTS

2019/0051290 A1*   2/2019   Li .......................... G10L 15/063
2019/0205748 A1*   7/2019   Fukuda .................. G06N 3/044
             (Continued)

OTHER PUBLICATIONS

Bang, Jihwan, et al. "Boosting active learning for speech recognition with noisy pseudo-labeled samples." arXiv preprint arXiv: 2006.11021. Nov. 2020, pp. 1-7. (Year: 2020).*
             (Continued)

*Primary Examiner* — James S Wozniak
(74) *Attorney, Agent, or Firm* — Honigman LLP; Brett A. Krueger; Grant Griffith

(57) ABSTRACT

A method includes receiving distillation data including a plurality of out-of-domain training utterances. For each particular out-of-domain training utterance of the distillation data, the method includes generating a corresponding augmented out-of-domain training utterance, and generating, using a teacher ASR model trained on training data corresponding to a target domain, a pseudo-label corresponding to the corresponding augmented out-of-domain training utterance. The method also includes distilling a student ASR model from the teacher ASR model by training the student ASR model using the corresponding augmented out-of-domain training utterances paired with the corresponding pseudo-labels generated by the teacher ASR model.

16 Claims, 5 Drawing Sheets

(52) U.S. Cl.
CPC ................. *G10L 2015/0635* (2013.01); *G10L 2015/0636* (2013.01)

(58) Field of Classification Search
USPC ........................................... 704/256.2, 256.3
See application file for complete search history.

(56) References Cited

U.S. PATENT DOCUMENTS

| | | | | |
|---|---|---|---|---|
| 2019/0287515 | A1* | 9/2019 | Li | G06N 3/084 |
| 2020/0134506 | A1* | 4/2020 | Wang | G06N 3/088 |
| 2020/0334538 | A1* | 10/2020 | Meng | G10L 15/16 |
| 2022/0188643 | A1* | 6/2022 | Fukuda | G06N 3/088 |
| 2022/0284891 | A1* | 9/2022 | Park | G10L 15/22 |
| 2023/0040181 | A1* | 2/2023 | Neelagiri | G10L 15/063 |
| 2023/0105590 | A1* | 4/2023 | Wei | G06V 30/19173 |
| | | | | 382/159 |
| 2025/0061277 | A1* | 2/2025 | Zhu | G06F 40/284 |

OTHER PUBLICATIONS

Manohar, Vimal, et al. "Kaizen: Continuously improving teacher using exponential moving average for semi-supervised speech recognition." 2021 IEEE Automatic Speech Recognition and Understanding Workshop (ASRU). IEEE, Oct. 2021, pp. 1-8. (Year: 2021).*

Mehmood, Haaris, et al. "Fednst: Federated noisy student training for automatic speech recognition." arXiv preprint arXiv: 2206.02797. Jul. 2022, pp. 1-5. (Year: 2022).*

Nakano, et al. "Knowledge distillation leveraging alternative soft targets from non-parallel qualified speech data." arXiv preprint arXiv:2112.08878. Dec. 2021, pp. 1-5. (Year: 2021).*

Park, Hyun-Jin, et al. "Noisy student-teacher training for robust keyword spotting." arXiv preprint arXiv:2106.01604. Jun. 2021, pp. 1-5. (Year: 2021).*

Weninger, Felix, et al. "Semi-supervised learning with data augmentation for end-to-end ASR." arXiv preprint arXiv:2007.13876. Jul. 2020, pp. 1-5. (Year: 2020).*

Xiao, et al. "Contrastive semi-supervised learning for asr." ICASSP 2021—2021 IEEE International Conference on Acoustics, Speech and Signal Processing (ICASSP). IEEE, Jun. 2021, pp. 3870-3874. (Year: 2021).*

Yang, Xiaoyu. "Knowledge Distillation for End-to-End Automatic Speech Recognition." Master's Thesis, Aug. 2021, pp. 1-53. (Year: 2021).*

Zhang, Yu, et al. "Bigssl: Exploring the frontier of large-scale semi-supervised learning for automatic speech recognition." IEEE Journal of Selected Topics in Signal Processing 16.6. Jul. 2022, pp. 1519-1532. (Year: 2022).*

Zhang, Y., et al. "Pushing the limits of semi-supervised learning for automatic speech recognition. arXiv 2020." arXiv preprint arXiv: 2010.10504, Jul. 2022, pp. 1-11. (Year: 2022).*

Zhu, Zhi, and Yoshinao Sato. "Speech emotion recognition using semi-supervised learning with efficient labeling strategies." 2021 IEEE Automatic Speech Recognition and Understanding Workshop (ASRU). IEEE, Dec. 2021, pp. 358-365. (Year: 2021).*

Panchapagesan, Sankaran, et al. "Efficient knowledge distillation for rnn-transducer models." ICASSP 2021—2021 IEEE International Conference on Acoustics, Speech and Signal Processing (ICASSP). IEEE, Nov. 2020, pp. 1-5. (Year: 2020).*

Sun, Hao, et al. "Token-level ensemble distillation for grapheme-to-phoneme conversion." arXiv preprint arXiv:1904.03446, Aug. 2019, pp. 1-5. (Year: 2019).*

Tzinis Efthymios et al: "RemixIT: Continual Self-Training of Speech Enhancement Models via Bootstrapped Remixing", IEEE Journal of Selected Topics in Signal Processing, IEEE, US vol. 16, No. 6, Aug. 20, 2022 (Aug. 20, 2022), pp. 1329-1341, XP011923766.

Dongseong Hwang et al: "Comparison of Soft and Hard Target RNN-T Distillation for Large-scale ASR", arvix.org, Cornell University Library, 201 Olin Library Cornell University Ithaca, NY 14853, Oct. 11, 2022 (Oct. 11, 2022), XP091341824.

International Search Report and Written Opinion issued in related PCT Application No. PCT/US2023/035318, dated Feb. 12, 2024.

* cited by examiner

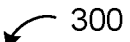

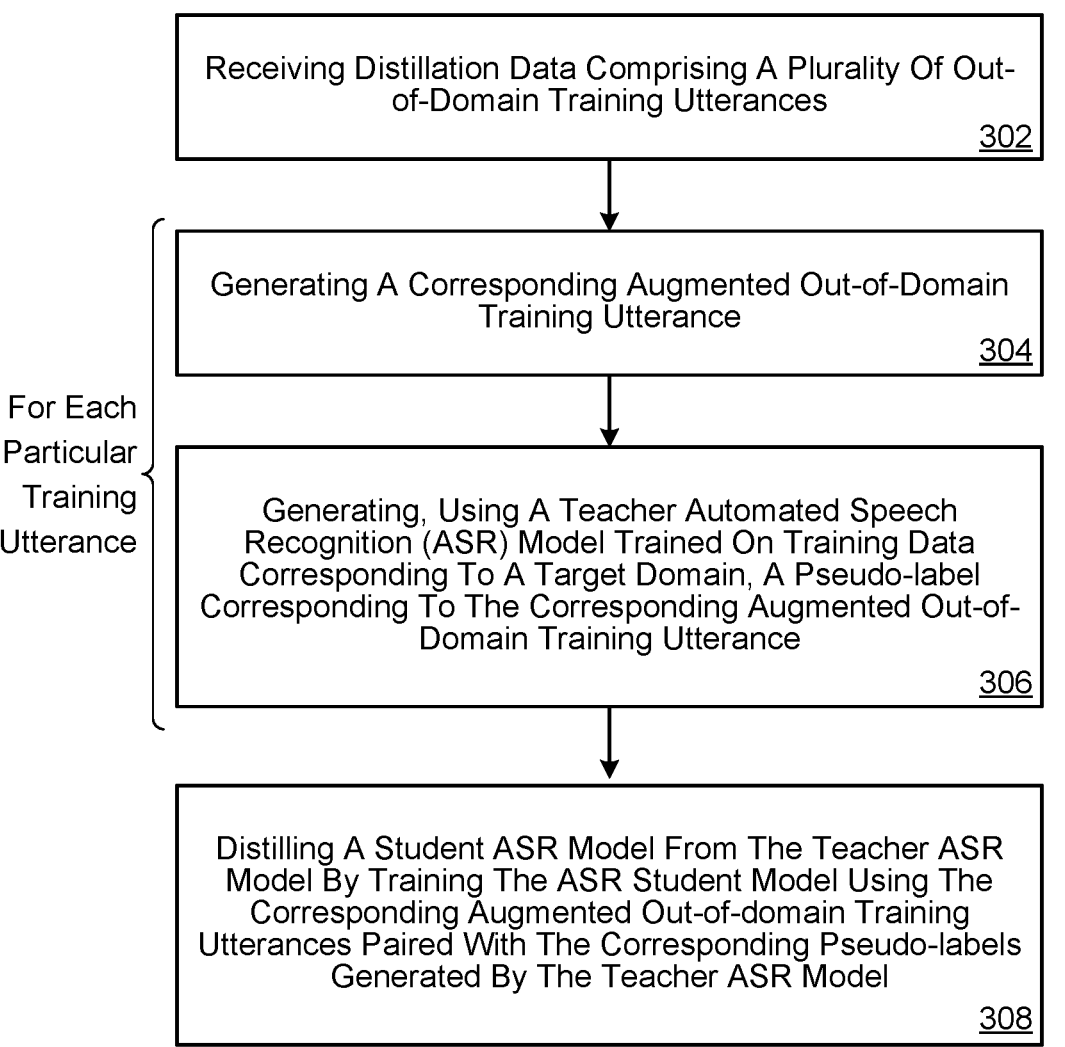

300

Receiving Distillation Data Comprising A Plurality Of Out-of-Domain Training Utterances

302

For Each Particular Training Utterance

Generating A Corresponding Augmented Out-of-Domain Training Utterance

304

Generating, Using A Teacher Automated Speech Recognition (ASR) Model Trained On Training Data Corresponding To A Target Domain, A Pseudo-label Corresponding To The Corresponding Augmented Out-of-Domain Training Utterance

306

Distilling A Student ASR Model From The Teacher ASR Model By Training The ASR Student Model Using The Corresponding Augmented Out-of-domain Training Utterances Paired With The Corresponding Pseudo-labels Generated By The Teacher ASR Model

KNOWLEDGE DISTILLATION WITH DOMAIN MISMATCH FOR SPEECH RECOGNITION

CROSS REFERENCE TO RELATED APPLICATIONS

This U.S. patent application claims priority under 35 U.S.C. § 119(e) to U.S. Provisional Application 63/380,140, filed on Oct. 19, 2022. The disclosure of this prior application is considered part of the disclosure of this application and is hereby incorporated by reference in its entirety.

TECHNICAL FIELD

This disclosure relates to training a speech recognition model.

BACKGROUND

Speech recognition systems are increasingly used to transcribe speech to text in many daily applications. These speech recognition systems may be embedded on user devices such as smart home devices or smartphones, or used in cloud-related services.

SUMMARY

One aspect of the disclosure provides a computer-implemented method for training a speech recognition model. The method, when executed by data processing hardware causes the data processing hardware to perform operations. The operations include receiving distillation data including a plurality of out-of-domain training utterances. For each particular out-of-domain training utterance of the distillation data, the operations include generating a corresponding augmented out-of-domain training utterance; and generating, using a teacher automated speech recognition (ASR) model trained on training data corresponding to a target domain, a pseudo-label corresponding to the corresponding augmented out-of-domain training utterance. The operations also include distilling a student ASR model from the teacher ASR model by training the student ASR model using the corresponding augmented out-of-domain training utterances paired with the corresponding pseudo-labels generated by the teacher ASR model.

Implementations of the computer-implemented method or the system of the disclosure may include one or more of the following optional features. In some implementations, distilling the student ASR model from the teacher ASR model includes training the student ASR model to recognize utterances corresponding to the target domain. In some examples, before receiving the distillation data, the teacher ASR model is trained on the training data including a plurality of target domain training utterances; and, after receiving the distillation data, the training data is unavailable to the teacher ASR model and the student ASR model. In some implementations, the training data includes a plurality of target domain training utterances, and one or more of the target domain training utterances of the plurality of target domain training utterances are not included in the distillation data. In some examples, augmenting the respective out-of-domain training utterance includes at least one of adding noise, adding reverberation, or manipulating timing.

In some implementations, the student ASR model executes in a cloud computing environment, and the teacher ASR model executes on one or more user devices in communication with the cloud computing environment. The training data may include a plurality of target domain training utterances, each target domain training utterance received at a respective one of the one or more user devices. In some examples, generating the pseudo-label corresponding to the corresponding augmented out-of-domain training utterance includes generating a probability distribution over possible speech recognition hypotheses, wherein the pseudo-label includes N-best speech recognition hypotheses having the highest probabilities. In some implementations, distilling the student ASR model from the teacher ASR model includes, for each particular augmented out-of-domain training utterance: generating, using the student ASR model, a transcription corresponding to the particular augmented out-of-domain training utterance; generating a loss based on the pseudo-label corresponding to the particular augmented out-of-domain training utterance and the transcription corresponding to the particular augmented out-of-domain training utterance; and updating parameters of the student ASR model using the loss. The loss may be at least one of a cross-entropy loss, a Kullback-Leibler (KL) divergence loss, or an L2 loss.

Another aspect of the disclosure provides a system including data processing hardware and memory hardware in communication with data processing hardware. The memory hardware stores instructions that, when executed on the data processing, hardware causes the data processing hardware to perform operations. The operations include receiving distillation data including a plurality of out-of-domain training utterances. For each particular out-of-domain training utterance of the distillation data, the operations include generating a corresponding augmented out-of-domain training utterance; and generating, using a teacher automated speech recognition (ASR) model trained on training data corresponding to a target domain, a pseudo-label corresponding to the corresponding augmented out-of-domain training utterance. The operations also include distilling a student ASR model from the teacher ASR model by training the student ASR model using the corresponding augmented out-of-domain training utterances paired with the corresponding pseudo-labels generated by the teacher ASR model.

Implementations of the computer-implemented method or the system of the disclosure may include one or more of the following optional features. In some implementations, distilling the student ASR model from the teacher ASR model includes training the student ASR model to recognize utterances corresponding to the target domain. In some examples, before receiving the distillation data, the teacher ASR model is trained on the training data including a plurality of target domain training utterances; and, after receiving the distillation data, the training data is unavailable to the teacher ASR model and the student ASR model. In some implementations, the training data includes a plurality of target domain training utterances, and one or more of the target domain training utterances of the plurality of target domain training utterances are not included in the distillation data. In some examples, augmenting the respective out-of-domain training utterance includes at least one of adding noise, adding reverberation, or manipulating timing.

In some implementations, the student ASR model executes in a cloud computing environment, and the teacher ASR model executes on one or more user devices in communication with the cloud computing environment. The training data may include a plurality of target domain training utterances, each target domain training utterance received at a respective one of the one or more user devices.

In some examples, generating the pseudo-label corresponding to the corresponding augmented out-of-domain training utterance includes generating a probability distribution over possible speech recognition hypotheses, wherein the pseudo-label includes N-best speech recognition hypotheses having the highest probabilities. In some implementations, distilling the student ASR model from the teacher ASR model includes, for each particular augmented out-of-domain training utterance: generating, using the student ASR model, a transcription corresponding to the particular augmented out-of-domain training utterance; generating a loss based on the pseudo-label corresponding to the particular augmented out-of-domain training utterance and the transcription corresponding to the particular augmented out-of-domain training utterance; and updating parameters of the student ASR model using the loss. The loss may be at least one of a cross-entropy loss, a Kullback-Leibler (KL) divergence loss, or an L2 loss.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a flow chart of an example arrangement of operations for a method of training a speech recognition model using knowledge distillation with domain mismatch.

Like reference symbols in the various drawings indicate like elements.

DETAILED DESCRIPTION

Knowledge distillation may be used to transfer knowledge from one model (i.e., a teacher model) to another model (i.e., a student model). Conventional knowledge distillation assumes that data in a target domain that is used to train the teach model is available for training the student model. Alternatively, complex sophisticated methods are needed to generate suitable data for training the student model. However, in many instances, training data matching the target domain is not available for training the student model. For example, for training an automatic speech recognition (ASR) to recognize long-tail languages (e.g., Sub-Saharan African languages), there may be an inadequate amount of training data available. While federated training may be used to train a server-side model, privacy concerns restrict on-device data used for training on-device speech recognition models from leaving user devices. Thus, the server-side model (i.e., a student model) cannot be trained using conventional knowledge distillation based on on-device models (i.e., teacher models) as there isn't available training data matching the target domain to which the on-device models were trained. Therefore, there is a need for methods and systems for performing knowledge distillation to train a student model when the domain of training data available to train the student model does not match the domain of training data used to train the teacher model. While examples disclosed herein relate to training a student ASR model using knowledge distillation with a domain mismatch, disclosed examples may be used to train other types of models using knowledge distillation with a domain mismatch. That is, when the training data for training a teacher model is from a domain that does not match (i.e., is different from) the domain of training data that is available to train a student model.

Figure 1:
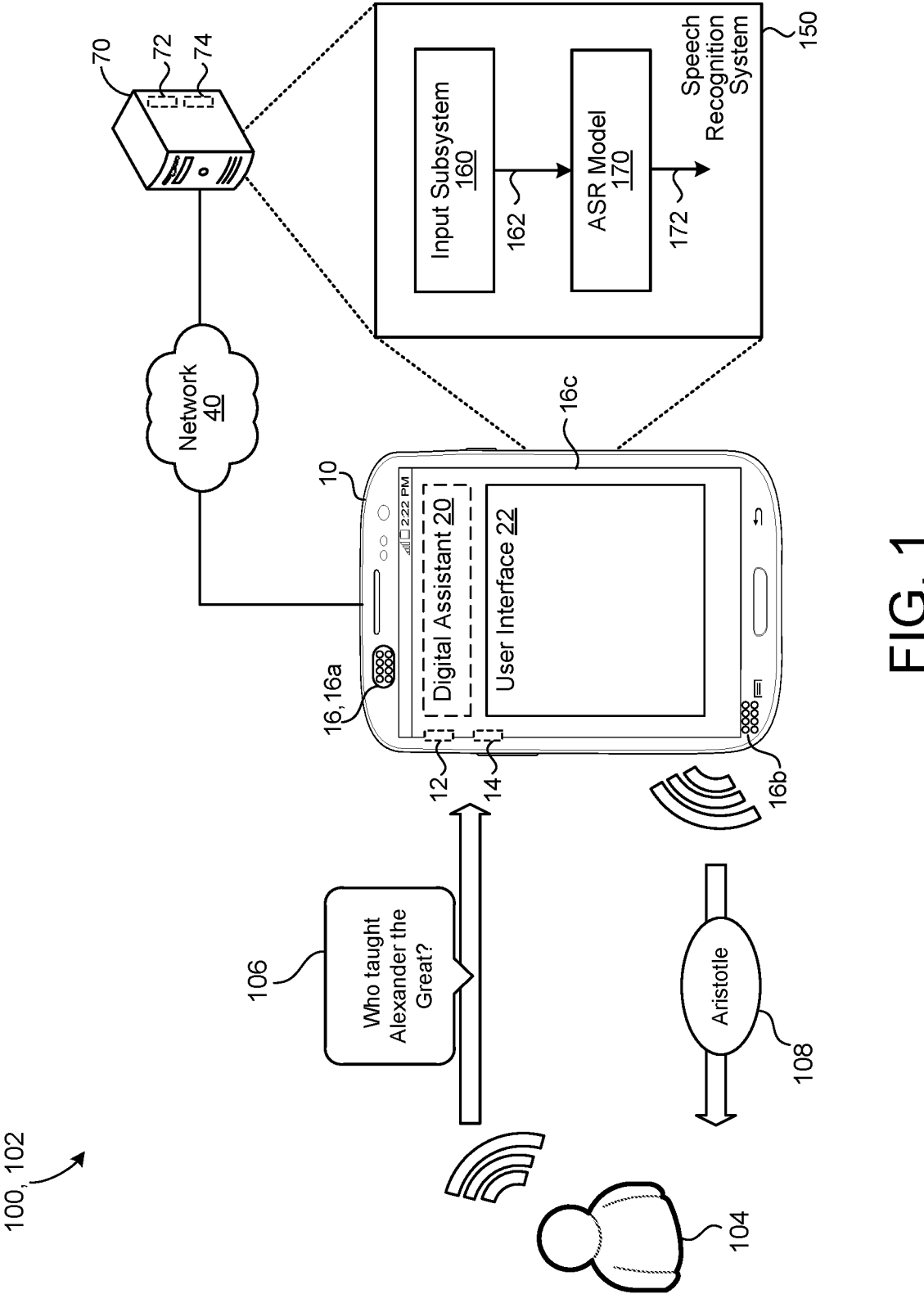
FIG. 1 is a schematic view of an example speech environment using a speech recognition system for transcribing utterances.

Referring to FIG. 1, in some implementations, a speech environment 100 includes a user 104 using spoken utterances 106 to interact with a voice-enabled device 10 (also referred to as a user device 10). Here, a spoken utterance 106 corresponds to, for example, a dictation for transcription, or a query to solicit a response from the user device 10 or to have the user device 10 execute a task specified by the query. In this sense, the user 104 may have conversational-like interactions with the user device 10 to perform computing activities or find answers to questions. In the example shown, a system 102 includes an ASR model 170 of a speech recognition system 150 for generating a transcription 172 of the utterance 106. The transcription 172 may then processed by a digital assistant 20 to generate a response to the utterance 106 or execute a task specified by the utterance 106. In some implementations, the digital assistant 20 includes a natural language processing/understanding (NLP/NLU) module executing on the user device 10 or a remote computing system 70 for processing the transcription 172 to understand the utterance 106. The digital assistant 20 may provide a response as text in a user interface 22 on a display 16c of the user device 10 or as audio signals 108 output by a speaker 16b of the user device 10. In some examples, the digital assistant 20 generates text representing a response, and a text-to-speech (TTS) system converts the text to audio signals 108 as synthetic speech. In the example shown, the user 104 speaks an utterance 106 asking "Who taught Alexander the Great," and the digital assistant 20 responds with audio data 108 representing a response of "Aristotle."

The user device 10 may correspond to any computing device associated with a user 104 and capable of capturing audio data 162, and providing textual or audible outputs. Some examples of user devices 10 include, but are not limited to, mobile devices (e.g., mobile phones, tablets, laptops, etc.), computers, wearable devices (e.g., a smart watch, smart glasses, smart goggles, an AR headset, a VR headset, etc.), smart appliances, Internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes one or more input/output devices 16, 16a-c, such as an audio capture device 16, 16a (e.g., a microphone) for capturing and converting spoken utterances 106 into electrical signals, an audio output device 16, 16b (e.g., a speaker) for communicating an audible audio signal (e.g., as output audio data from the user device 10), and the display 16, 16c for displaying the visual content. Of course, any number and/or type(s) of other input/output devices 16 may be used. The input/output devices 16 may reside on or be in communication with the user device 10.

The speech recognition system 150 executes on the user device 10 of the user 104 and/or on a remote computing system 70 (e.g., one or more remote servers of a distributed system executing in a cloud-computing environment) in communication with the user device 10 via a network 40. The speech recognition system 150 includes an input sub-system 160 configured to receive the utterances 106 spoken by the user 104 and captured by the audio capture device 16a, and convert each utterance 106 into a corresponding digital format associated with input acoustic frames 162 (also generally referred to as audio data 162) capable of being processed by the speech recognition system 150. Thereafter, the ASR model 170 of the speech recognition system 150 receives, as input, the audio data 162 corresponding to a current utterance 106, and generates/predicts, as output, a corresponding transcription 172 (e.g., recognition result/hypothesis) of the utterance 106.

The remote computing system 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The ASR model 170 may have different types of neural network architectures. In some examples, the ASR model 170 includes a conformer-based encoder and a listen attend spell (LAS) decoder. In some implementations, the conformer-based encoder may include 600 million trainable parameters, and the LAS decoder may include 200 million trainable parameters. In other examples, the ASR model 170 includes an RNN-T model with an encoder-decoder architecture. Here, the decoder architecture of the RNN-T model includes a joint/prediction network. An audio encoder of the ASR model 170 may include a cascaded encoder architecture.

Figure 2A:
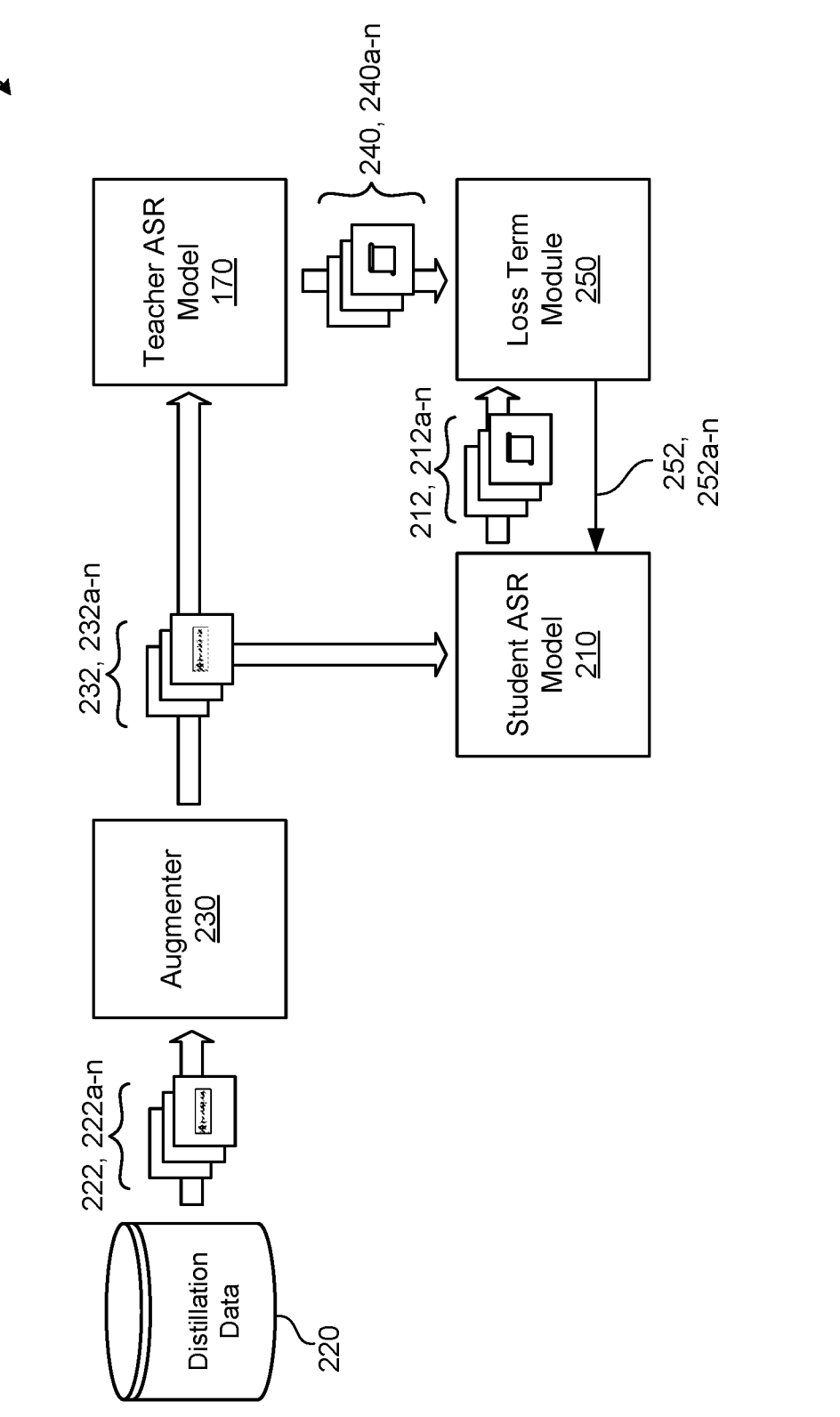
FIG. 2A is a schematic view of an example training process for training a speech recognition model using knowledge distillation with domain mismatch.

FIG. 2A depicts an example training process 200a for training a student ASR model 210 from the ASR model 170 (i.e., a teacher ASR model 170) using knowledge distillation with domain mismatch. That is, domain mismatch occurs when the training data used to train the teacher ASR model 170 was from a target domain that does not match (i.e., is different from) the domain of training data that is available to train the student ASR model 210. The training process 200a includes a knowledge distillation training process where the teacher ASR model 170 distills its knowledge to the student ASR model 210. Here, the teacher ASR model 170 distills its knowledge to the student ASR model 210 by training the student ASR model 210 with distillation data 220 that includes a plurality of out-of-domain training utterances 222, 222a-n. Notably, the out-of-domain training utterances 222 are from a domain that is different from the target domain of training data (i.e., target domain training utterances) that was used to train the teacher ASR model 170 prior to distilling knowledge to the student ASR model 210. Here, the student ASR model 210 learns to predict transcriptions 212, 212a-n matching pseudo-labels 240, 240a-n produced by the teacher ASR model 170 in order to train the student ASR model 210 to recognize utterances corresponding to the target domain. In a federated learning example, the student ASR model 210 executes in a cloud computing environment (e.g., a server-side model executing on the remote computing system 70), and the teacher ASR model 170 executes on the user device 10 in communication with the cloud computing environment. Here, the target domain training utterances used to train the teacher ASR model 170 are received at the user device 10 from the user 104 of the user device 10 and are not available for training the student ASR model 210. Hence, the target domain training utterances are only processed by the teacher ASR model 170 for the purpose of training the teacher ASR model 170, whereby neither the target domain training utterances nor sensitive information derived from target domain training utterances are sent/communicated to the cloud computing environment.

FIG. 2A depicts the student ASR model 210 being training using a single teacher ASR model 170 executing on the user device 10. However, the student ASR model 210 may be trained using one or more teacher ASR models 170 executing on one or more user devices 10, where the target domain training utterances used to train each teacher ASR model 170 are received at respective ones of the one or more user devices 10 from corresponding users. Notably, each teacher ASR model 170 may be associated with its own target domain training utterances, which are not made available for training other teacher ASR models 170 or the student ASR model 210. The architecture of the teacher ASR model 170 may be different from that of the student ASR model 210. Additionally or alternatively, the teacher ASR model 170 and the student ASR model 210 may have different sizes. Notably, it has been found that, for ASR for long-tail languages, the teacher ASR model 170 can be 32 times smaller than the student ASR model 210 and still achieve good knowledge distillation.

During the training process 200a, an augmenter 230 receives the out-of-domain training utterances 222 and, for each particular out-of-domain training utterance 222, generates a corresponding augmented out-of-domain training utterance 232, 232a-n. The augmenter 230 generates an augmented out-of-domain training utterance 232 by, for example, adding noise to, adding reverberation to, or manipulating the timing of, the corresponding out-of-domain training utterance 222. In some implementations, the augmenter 230 generates an augmented out-of-domain training utterance 232 using Gaussian noise injection (GNI). For example, for out-of-domain training utterances 222 represented by Log-Mel input features, the augmenter 230 may augment an out-of-domain training utterance 222 by randomly varying the values of one or more input features of the out-of-domain training utterance 222 by adding a corresponding random value drawn from a Gaussian distribution to the value of each of the one or more varied input features. Here, the augmenter 230 may not vary all of the input features. The mean and the variance of the Gaussian distribution may be computed from the corresponding frequency channel in the input features. Alternatively, one or more input features may be replaced by a corresponding random value drawn from a Gaussian distribution. Here, GNI may be tuned using a single hyper-parameter representing a probability ranging from zero to one hundred percent that indicates whether a particular input feature is varied/replaced such that GNI-based augmentation may be easily tuned. Notably, target domain training utterances used to train the teacher ASR model 170 are not available after receiving the distillation data 220, and the distillation data 220 does not need to include any such target domain training utterances. In the example shown, the augmenter 230 generates a single augmented training utterance 232 for each training utterance 222. However, the augmenter 230 may generate multiple augmented training utterances 232 for each training utterance 222.

For each particular augmented out-of-domain training utterance 232, the teacher ASR model 170 generates a pseudo-label 240, 240a-n corresponding to the particular augmented out-of-domain training utterance 232. In some implementations, the teacher ASR model 170 generates the corresponding pseudo-label 240 by generating a probability distribution over possible speech recognition hypotheses for the particular augmented out-of-domain training utterance 232, and the pseudo-label 240 is the speech recognition hypothesis having the highest probability. Notably, the teacher ASR model 170 may generate a pseudo-label 240 for the particular augmented out-of-domain training utterance 232 that differs from a pseudo-label generated by the teacher ASR model 170 for the corresponding out-of-domain training utterance 222. Thus, the augmenter 230 effectively and dynamically creates a large unlabeled dataset with almost zero cost to increase the abundance and the coverage of the distillation data 220, which provides more opportunities for the teacher ASR model 170 to distill knowledge in the target domain to the student ASR model 210.

For each particular augmented out-of-domain training utterance 232, the student ASR model 210 generates a corresponding predicted transcription 212 corresponding to the particular augmented out-of-domain training utterance 232. In some implementations, the student ASR model 210 generates the corresponding predicted transcription 212 by generating a probability distribution over possible speech recognition hypotheses for the particular augmented out-of-domain training utterance 232, and the corresponding predicted transcription 212 is the speech recognition hypothesis having the highest probability.

Thereafter, the training process 200a distills knowledge to the student ASR model 210 from the teacher ASR model 170 by training the student ASR model 210 using the corresponding augmented out-of-domain training utterances 232 paired with the corresponding pseudo-labels 240 generated by the teacher ASR model 170. In particular, for each particular augmented out-of-domain training utterance 232, a loss term module 250 receives the corresponding pseudo-label 240 generated by the teacher ASR model 170 and the corresponding transcription 212 predicted by the student ASR model 210. Thereafter, the loss term module 250 generates a corresponding loss 252, 252a-n based on the corresponding pseudo-label 240 and the corresponding predicted transcription 212, and updates parameters of the student ASR model 210 using the loss 252. In some implementations, the corresponding loss 252 is expressed as:

$$\sum_i L_{dist}\left(P_s\left(\tilde{y}_i^{sl} \mid \tilde{x}, \tilde{y}_{<i}^{sl}\right), P_t\left(\tilde{y}_i^{sl} \mid \tilde{x}, \tilde{y}_{<i}^{sl}\right)\right), \tag{1}$$

where $\tilde{x}$ is the corresponding augmented training utterance 232 for a particular training utterance x 222, and $\tilde{y}^{sl}$ is pseudo-label 240 generated by the teacher ASR model that is inferred from $\tilde{x}$. The functions $P_s$ and $P_t$ are the output logits from the student ASR model 210 and the teacher ASR model 170, respectively, and have the same shape. The loss function $L_{dist}$ may be any distillation loss, e.g., a cross-entropy loss, a Kullback-Leibler (KL) divergence loss, or an L2 loss.

Alternatively, the corresponding loss 252 may be expressed as:

$$\sum_k P\left(\tilde{y}_k^{sl} \mid \tilde{x}\right) \sum_i L_{dist}\left(P_s\left(\tilde{y}_{k_i}^{sl} \mid \tilde{x}, \tilde{y}_{k_{<i}}^{sl}\right), P_t\left(\tilde{y}_{k_i}^{sl} \mid \tilde{x}, \tilde{y}_{k_{<i}}^{sl}\right)\right) \tag{2}$$

which utilizes, for each particular augmented out-of-domain training utterance $\tilde{x}$ 232, multiple pseudo-labels 240 generated by the teacher ASR model 170 from the augmented out-of-domain training utterance 232 in a beam-search. In some implementations, the teacher ASR model 170 generates the corresponding pseudo-labels 240 by generating a probability distribution over possible speech recognition hypotheses for each particular augmented out-of-domain training utterance $\tilde{x}$ 232 in a beam search, where the multiple pseudo-labels 240 represent the N-best speech recognition hypotheses having the highest probabilities. Similarly, the student ASR model 210 may generate corresponding predicted transcriptions 212 by generating a probability distribution over possible speech recognition hypotheses for each particular augmented out-of-domain training utterance $\tilde{x}$ 232 in a beam search, where the multiple predicted transcriptions 212 represent the N-best speech recognition hypotheses having the highest probabilities. Here, the loss of EQN (1) for each particular hypothesis $\tilde{y}_k$ is multiplied by the posterior probability $P(\tilde{y}_k^{sl} \mid \tilde{x})$ of the particular hypothesis $\tilde{y}_k$. This weighting operation may be either implemented as a weighted sum or a random sampling. In general, the loss of EQN (2) is capable of providing better word coverage given a particular augmented out-of-domain training utterance 232 compared to the loss of EQN (1).

Figure 2B:
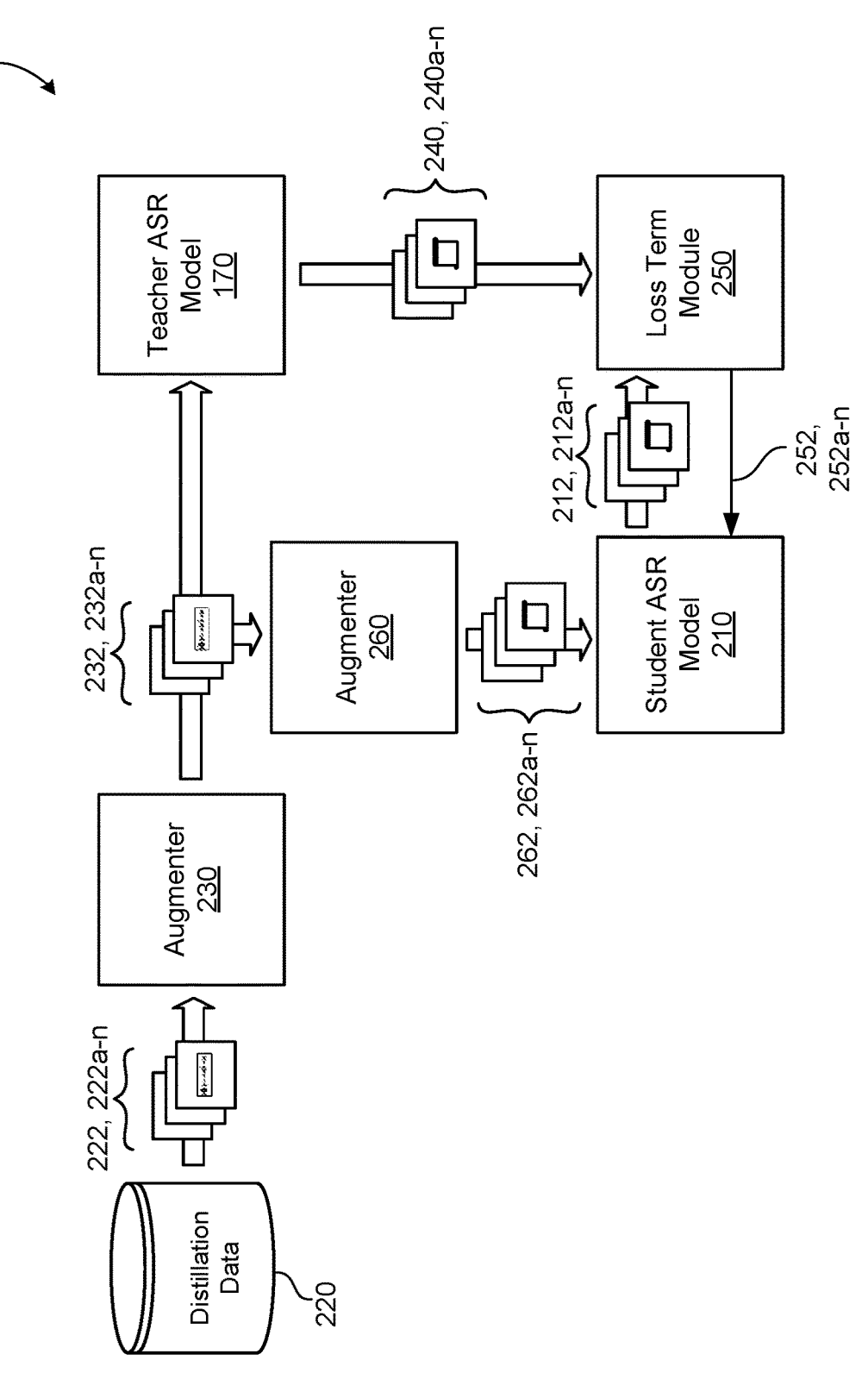
FIG. 2B is a schematic view of another example training process for training a speech recognition model using knowledge distillation with domain mismatch.

FIG. 2B depicts another example training process 200b for training a student ASR model 210 from the ASR model 170 (i.e., a teacher ASR model 170) using knowledge distillation with domain mismatch. Compared to the training process 200a of FIG. 2A, the training process 200b of FIG. 2B includes an additional augmenter 260 for altering the augmented out-of-domain training utterances 232 to form student training utterances 262, 262a-n for input to the student ASR model 210. Here, the teacher ASR model 170 still processes the augmented out-of-domain training utterances 232 and, thus, the pseudo-labels 240 are unaffected by the augmenter 260. In some examples, the augmenter 260 adds noise (e.g., using GNI) or performs some other type of spectral augmentation. Thus, the student ASR model 210 learns from a noisy student learning framework so the student ASR model 210 learns that slight differences in input utterances may result in the same pseudo-labels 240 and, thus, provides an additional degree of robustness to the training process 200b. Here, the augmenter 260 may create more than one student training utterance 262 per augmented out-of-domain training utterance 232.

FIG. 3 is a flowchart of an exemplary arrangement of operations for a computer-implemented method 300 of training an ASR model 210 using knowledge distillation with domain mismatch. The operations may be performed by data processing hardware 410 (FIG. 4) (e.g., the data processing hardware 12 of the user device 10 or the data processing hardware 72 of the remote computing system 70) based on executing instructions stored on memory hardware 420 (e.g., the memory hardware 14 of the user device 10 or the memory hardware 74 of the remote computing system 70).

At operation 302, the method 300 includes receiving distillation data 220 including a plurality of out-of-domain training utterances 222. For each particular out-of-domain training utterance 222 of the distillation data 220, the method 300 includes, at operation 304, generating a corresponding augmented out-of-domain training utterance 232 and, at operation 306, generating, using the teacher ASR model 170 trained on training data corresponding to a target domain, a pseudo-label 240 corresponding to the corresponding augmented out-of-domain training utterance 232. At operation 308, the method 300 includes distilling the student ASR model 210 from the teacher ASR model 170 by training the student ASR model 210 using the corresponding augmented out-of-domain training utterances 232 paired with the corresponding pseudo-labels 240 generated by the teacher ASR model 170.

Figure 4:
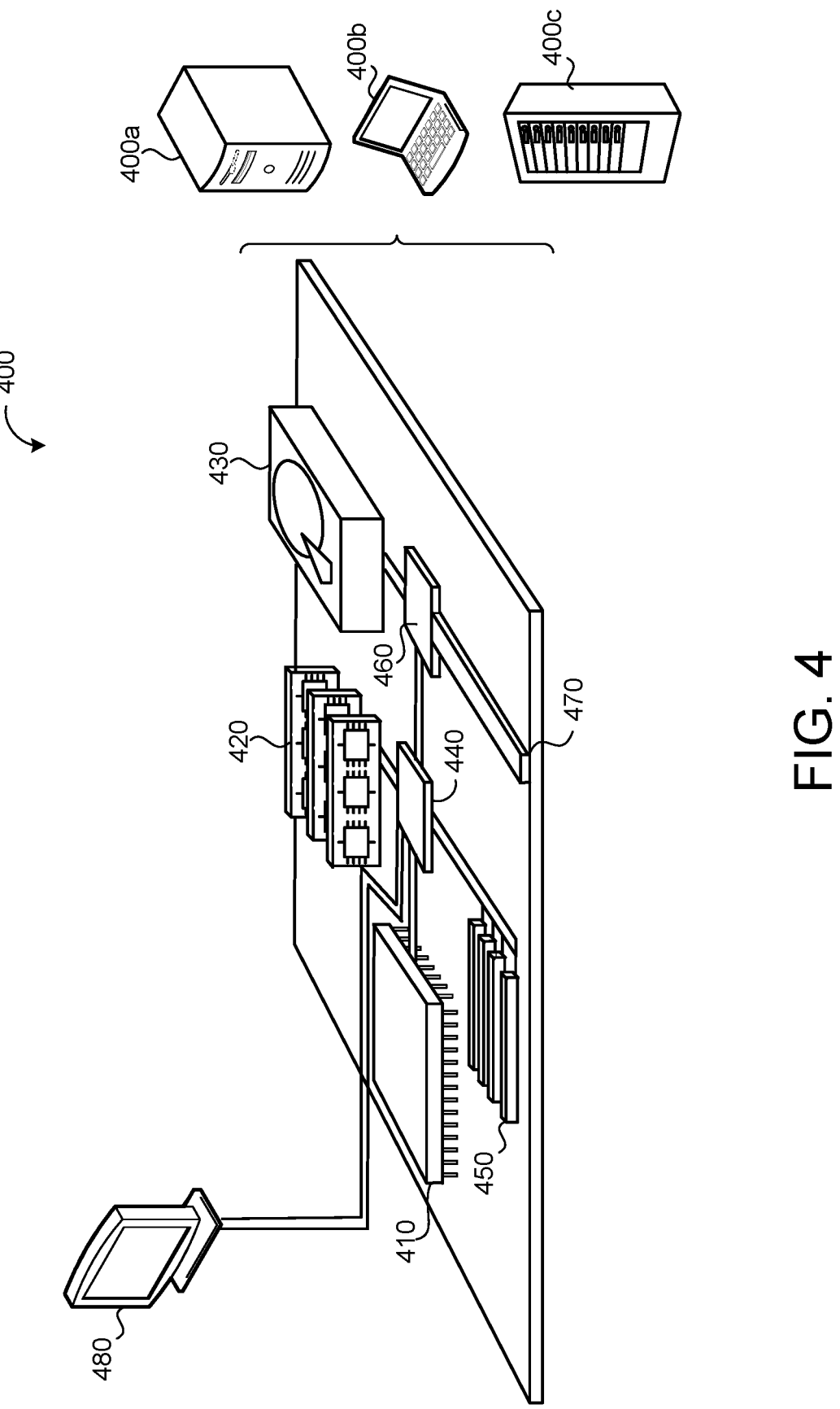
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (i.e., data processing hardware) that can be used to implement the data processing hardware 12 and/or 72, memory 420 (i.e., memory hardware) that can be used to implement the memory hardware 14 and/or 74, a storage device 430 (i.e., memory hardware) that can be used to implement the memory hardware 14 and/or 74, a high-speed interface/controller 440 connecting to the memory 420 and high-speed expansion ports 450, and a low speed interface/controller 460 connecting to a low speed bus 470 and a storage device 430 that can be used to store the distillation data 220. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

receiving distillation data comprising a plurality of out-of-domain training utterances;

for each particular out-of-domain training utterance of the distillation data:

generating a corresponding augmented out-of-domain training utterance;

generating, using a teacher automated speech recognition (ASR) model trained on training data corresponding to a target domain, a corresponding probability distribution over possible speech recognition hypotheses for the corresponding augmented out-of-domain training utterance; and generating multiple corresponding pseudo labels that represent the N-best speech recognition hypotheses from the corresponding probability distribution over possible speech recognition hypotheses; and distilling a student ASR model from the teacher ASR model by, for each corresponding augmented out-of-domain training utterance:

generating, using the student ASR model, a transcription corresponding to the corresponding augmented out-of-domain training utterance;

generating a loss computed over the multiple corresponding pseudo-labels weighted by the corresponding probability distribution over possible speech recognition results and the transcription corresponding to the corresponding augmented out-of-domain training utterance; and updating parameters of the teacher model using the loss.

2. The computer-implemented method of claim 1, wherein distilling the student ASR model from the teacher ASR model comprises training the student ASR model to recognize utterances corresponding to the target domain.

3. The computer-implemented method of claim 1, wherein:

before receiving the distillation data, the teacher ASR model is trained on the training data comprising a plurality of target domain training utterances; and after receiving the distillation data, the training data is unavailable to the teacher ASR model and the student ASR model.

4. The computer-implemented method of claim 1, wherein:

the training data comprises a plurality of target domain training utterances; and one or more of the target domain training utterances of the plurality of target domain training utterances are not included in the distillation data.

5. The computer-implemented method of claim 1, wherein augmenting the respective out-of-domain training utterance comprises at least one of adding noise, adding reverberation, or manipulating timing.

6. The computer-implemented method of claim 1, wherein:

the student ASR model executes in a cloud computing environment; and the teacher ASR model executes on one or more user devices in communication with the cloud computing environment.

7. The computer-implemented method of claim 6, wherein the training data comprises a plurality of target domain training utterances, each target domain training utterance received at a respective one of the one or more user devices.

8. The computer-implemented method of claim 1, wherein the loss comprises at least one of a cross-entropy loss, a Kullback-Leibler (KL) divergence loss, or an L2 loss.

9. A system comprising:
data processing hardware; and
memory hardware in communication with the data processing hardware, the memory hardware storing instructions that when executed on the data processing hardware cause the data processing hardware to perform operations comprising:
  receiving distillation data comprising a plurality of out-of-domain training utterances;
  for each particular out-of-domain training utterance of the distillation data:
    generating a corresponding augmented out-of-domain training utterance;
    generating, using a teacher automated speech recognition (ASR) model trained on training data corresponding to a target domain, a corresponding probability distribution over possible speech recognition hypotheses for the corresponding augmented out-of-domain training utterance; and
    generating multiple corresponding pseudo labels that represent the N-best speech recognition hypotheses from the corresponding probability distribution over possible speech recognition hypotheses; and
  distilling a student ASR model from the teacher ASR model by, for each corresponding augmented out-of-domain training utterance:
    generating, using the student ASR model, a transcription corresponding to the corresponding augmented out-of-domain training utterance;
    generating a loss computed over the multiple corresponding pseudo-labels weighted by the corresponding probability distribution over possible speech recognition results and the transcription corresponding to the corresponding augmented out-of-domain training utterance; and
    updating parameters of the teacher model using the loss.

10. The system of claim 9, wherein distilling the student ASR model from the teacher ASR model comprises training the student ASR model to recognize utterances corresponding to the target domain.

11. The system of claim 9, wherein:
before receiving the distillation data, the teacher ASR model is trained on the training data comprising a plurality of target domain training utterances; and
after receiving the distillation data, the training data is unavailable to the teacher ASR model and the student ASR model.

12. The system of claim 9, wherein:
the training data comprises a plurality of target domain training utterances; and
one or more of the target domain training utterances of the plurality of target domain training utterances are not included in the distillation data.

13. The system of claim 9, wherein augmenting the respective out-of-domain training utterance comprises at least one of adding noise, adding reverberation, or manipulating timing.

14. The system of claim 9, wherein:
the student ASR model executes in a cloud computing environment; and
the teacher ASR model executes on one or more user devices in communication with the cloud computing environment.

15. The system of claim 14, wherein the training data comprises a plurality of target domain training utterances, each target domain training utterance received at a respective one of the one or more user devices.

16. The system of claim 9, wherein the loss comprises at least one of a cross-entropy loss, a Kullback-Leibler (KL) divergence loss, or an L2 loss.

\* \* \* \* \*